United States Patent
Wang (10) Patent No.: US 12,437,039 B2
(45) Date of Patent: Oct. 7, 2025

(54) UNIVERSAL SYSTEM FOR EXTRACTING DATA

(71) Applicant: BOE TECHNOLOGY GROUP CO., LTD., Beijing (CN)

(72) Inventor: Huailiang Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 123 days.

(21) Appl. No.: 18/567,395

(22) PCT Filed: Jun. 7, 2021

(86) PCT No.: PCT/CN2021/098638
§ 371 (c)(1),
(2) Date: Dec. 6, 2023

(87) PCT Pub. No.: WO2022/256969
PCT Pub. Date: Dec. 15, 2022

(65) Prior Publication Data
US 2024/0273171 A1 Aug. 15, 2024

(51) Int. Cl.
*G06F 21/31* (2013.01)
*G06F 16/25* (2019.01)
*G06F 21/62* (2013.01)

(52) U.S. Cl.
CPC .......... *G06F 21/31* (2013.01); *G06F 21/6209* (2013.01)

(58) Field of Classification Search
CPC ....... G06F 21/31; G06F 21/6209; G06F 16/25
See application file for complete search history.

(56) References Cited

U.S. PATENT DOCUMENTS

| | | | | |
|---|---|---|---|---|
| 8,745,718 | B1* | 6/2014 | Dufel | H04L 63/20 726/8 |
| 11,516,204 | B1* | 11/2022 | Sefton | H04L 41/0869 |
| 2009/0177685 | A1* | 7/2009 | Ellis | G06Q 20/085 |
| 2018/0032706 | A1 | 2/2018 | Fox et al. | |
| 2018/0074797 | A1 | 3/2018 | Ludwig et al. | |

(Continued)

FOREIGN PATENT DOCUMENTS

| | | |
|---|---|---|
| CN | 106777222 A | 5/2017 |
| CN | 107368503 A | 11/2017 |

(Continued)

OTHER PUBLICATIONS

China Patent Office, First Office Action issued Apr. 11, 2024 for application No. CN202180001459.1.

*Primary Examiner* — Darren B Schwartz
(74) *Attorney, Agent, or Firm* — HOUTTEMAN LAW LLC (57) ABSTRACT

A universal system for extracting data, applied to a data consumer, where the system is based on microservice architecture, and includes a service registry, where the system includes: at least one configuration service, each of which is configured to perform related configuration for an extraction task of extracting data from a corresponding data producer; and at least one execution service, each of which is configured to execute the extraction task and map the extracted data to a target location, where the configuration service and the execution service are both registered to the microservice architecture, and each use a REST interface to transfer data when communicating with the data producer.

14 Claims, 7 Drawing Sheets

(56) References Cited

U.S. PATENT DOCUMENTS

2019/0327236 A1\* 10/2019 Ahuja .................. H04L 9/0894
2019/0342162 A1\* 11/2019 Bendre ............... H04L 67/1001
2022/0078248 A1\* 3/2022 Upton ................. H04L 65/1073

FOREIGN PATENT DOCUMENTS

| CN | 107622055 A | 1/2018 |
| CN | 108062248 A | 5/2018 |
| CN | 108846076 A | 11/2018 |
| CN | 109191008 A | 1/2019 |
| CN | 111061715 A | 4/2020 |
| CN | 111680033 A | 9/2020 |
| CN | 111752965 A | 10/2020 |
| KR | 20180077839 A | 7/2018 |
| WO | 2015044155 A1 | 4/2015 |

\* cited by examiner

| | |
|---|---|
| Selecting data source type | POSTGRESOL ▼ |
| Template name | pg_test |
| Template description | description of pg_test |
| POSTGRESOL connection parameters | Parameter name: sslmode   Parameter value: disable |
| POSTGRESOL address | 10.10.85.33   5432 |
| Authentication mode | ● Default |

FIG. 6

| | |
|---|---|
| Data source type | postgresql ▼ |
| Data source | datasource-pg-dest ▼ |
| Database name | test ▼ |
| Table name | tb_staff ▼ |
| Write mode | insert ▼ |
| Batch size | |

UNIVERSAL SYSTEM FOR EXTRACTING DATA

TECHNICAL FIELD

The present disclosure relate to the field of data extraction, and in particular, to a universal system for extracting data.

BACKGROUND

As informatization progresses in enterprise, information systems are increasingly used in daily work, and different business departments, production lines, enterprises, and the like may form respective business systems.

Database, which is a core asset of a business system, has become a core asset of an enterprise and is not usually opened to a third party. Even business departments of a same enterprise cannot communicate with each other due to historical reasons, such as different programming languages and confidentiality requirements. However, with the continuous deepening of informatization construction, a large project usually is required to integrate business data provided by different enterprises or different business departments (data producers), but the flows of the services are not intercommunicated and the data are not shared. This has brought enormous difficulties to a user (data consumer) who develops the large project in terms of data analysis and utilization, report development, and analysis mining.

In the prior art, data is generally extracted from databases of different business systems, and then the extracted data is processed and integrated and then stored in a local database, through a data warehouse technology. However, the disadvantage of this solution is that the use of developed data extraction tools requires a significant price, which is difficult for most enterprises to afford. While the use of open source tools requires intrusion into the enterprise's database, which is usually not allowed by the enterprise. Moreover, with the above solution, a data consumer is required to develop data synchronization interfaces for different business systems, and a data producer calls the interface to extract and report data, which results in frequent interface development for the data consumer. At the same time, centralized reporting by data producers may cause significant data pressure on the data consumer.

SUMMARY

The present disclosure provides a universal system for extracting data, to solve the above technical problem in the prior art.

In a first aspect, to solve the above technical problem, an embodiment of the present disclosure provides a universal system for extracting data, applied to a data consumer, where the system is based on microservice architecture, and includes a service registry, where the system includes:
  at least one configuration service, each of which is configured to perform related configuration for an extraction task of extracting data from a corresponding data producer; and
  at least one execution service, each of which is configured to execute the extraction task and map the extracted data to a target location, where the configuration service and the execution service are both registered to the microservice architecture, and each use a REST interface to transfer data when communicating with the data producer.

In a possible implementation, the REST interface includes:
  an authentication interface based on REST and a data extraction interface based on the REST, where the authentication interface is configured to obtain authorization information to access the data producer, and the data extraction interface is configured to extract data from the data producer, using the authorization information.

In a possible implementation, the configuration service is further configured to:
  send an authorization request to the data producer through the authentication interface, where the authorization request carries a user name and a user password which are required by the data consumer for registration; and
  receive authorization information returned by the data producer based on the authorization request, where the authorization information is generated based on the username and the user password.

In a possible implementation, the configuration service is further configured to:
  acquire a field in a source data table, where required data are located, from the data producer; and
  map the field in the source data table to a field in a target data table of the data consumer, and establish a corresponding extraction task.

In a possible implementation, the configuration service is further configured to:
  send a data extraction request to the data producer through the data extraction interface, where the data extraction request carries the authorization information and information related to the source data table;
  receive a piece of sample data in the source data table returned based on the data extraction request; and
  acquire a field in the source data table and a corresponding field type based on the piece of sample data.

In a possible implementation, the configuration service is further configured to:
  define a data source of the extraction task based on the data producer and the source data table, and define a target data model corresponding to the target data table, where the target data model includes a mode of writing data extracted from the data producer into the target data table and a data format adopted by a field type of a field in the target data table;
  establish a mapping relation between the field in the source data table and the field in the target data table and a data format conversion mode of the mapping fields; and
  configure an execution period and a data synchronization mode of the extraction task, and establish the extraction task based on the target data model, the mapping relation and the corresponding data format conversion mode.

In a possible implementation, the execution service is configured to:
  generate a corresponding data extraction request according to the extraction task;
  send the data extraction request to the data producer through the data extraction interface, and receive correspondingly returned data in the source data table; and
  convert, through the extraction task, the returned data into data in the target data table and store the data.

In a possible implementation, the REST interface includes:
  a user list for storing a website of the data producer;

an interface for characterizing operations performed on the data producer;

a request parameter for characterizing a parameter requested from the data producer; and a return value for characterizing data returned by the data producer based on the request parameter.

In a possible implementation, a data format adopted by each of the request parameter and the return value is JSON format.

In a possible implementation, the REST interface is the authentication interface, the request parameter carries the authorization request, and the return value carries the authorization information.

In a possible implementation, the REST interface is the data extraction interface, the request parameter carries the authorization information and the data extraction request, and the return value carries data returned by the data producer based on the data extraction request.

In a possible implementation, the definition of the data source, the configuration of the target data model, and the establishment of the mapping relation are completed by adopting a graphical interface and based on user operation.

In a possible implementation, the configuration service and the execution service each use container technology, and each of the at least one configuration service and the at least one execution service runs in a respective container.

DETAIL DESCRIPTION OF EMBODIMENTS

The embodiments of the present disclosure provide a universal system for extracting data, to solve the above technical problem in the prior art.

In order to better understand the technical solution of the present disclosure, the following detailed descriptions are provided with accompanying drawings and specific embodiments. It should be understood that the embodiments of the present disclosure and the specific features in the embodiments are detailed descriptions of the technical solution of the present disclosure, but are not limitations to the technical solution of the present disclosure. In a case of no conflict, the embodiments of the present disclosure and the technical features in the embodiments may be combined with each other.

Figure 1:
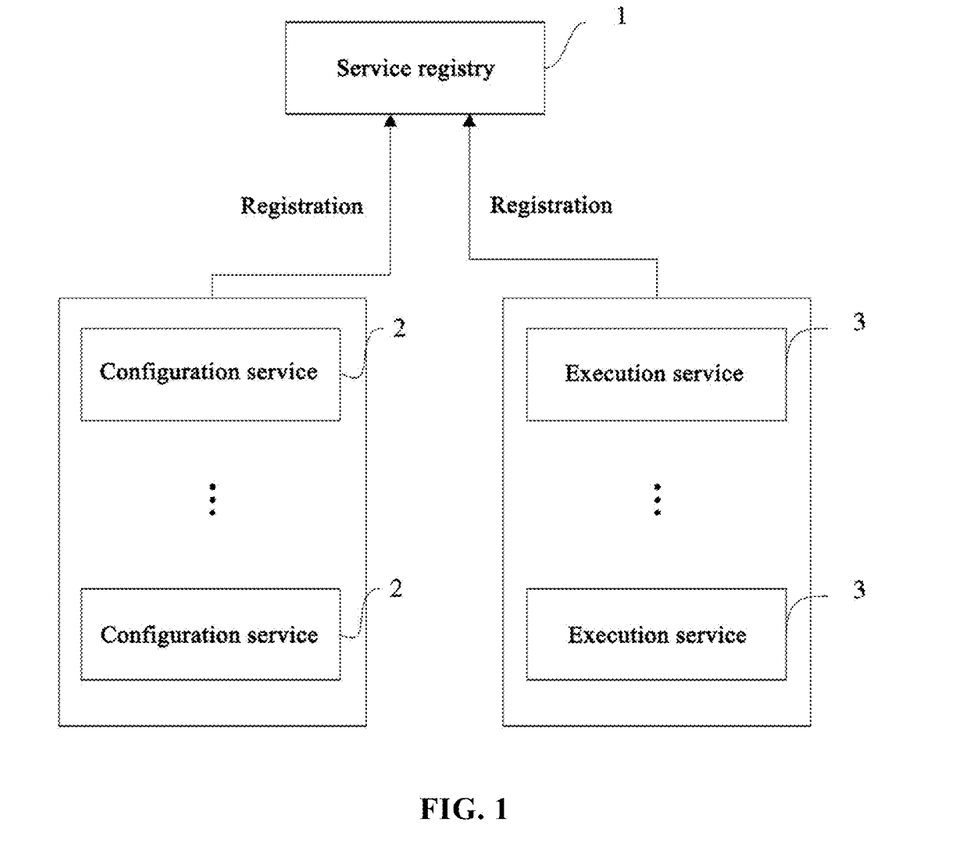
FIG. 1 is a schematic diagram showing a structure of a universal system for extracting data according to an embodiment of the present disclosure.

Referring to FIG. 1, an embodiment of the present disclosure provides a universal system for extracting data, which is applied to a data consumer. The system is based on microservice architecture, and includes a service registry 1. The system includes at least one configuration service 2 and at least one execution service 3.

Each of the at least one configuration service 2 is configured to perform relevant configuration for an extraction task of extracting data from a corresponding data producer. The relevant configuration includes a REST based data structure.

Each of the at least one execution service 3 is configured to execute the extraction task and map the extracted data to a target location. The configuration service and the execution service are both registered to the microservice architecture, and each use a REST interface to transfer data when communicating with the data producer.

The data producer may be a database of an external enterprise, organization and business department, and the data consumer may be a party that is required to integrate part of data in the database of the external enterprise, organization and business department. See FIG. 2, which is a diagram showing a relationship between a data consumer and a data producer according to an embodiment of the present disclosure.

Figure 2:
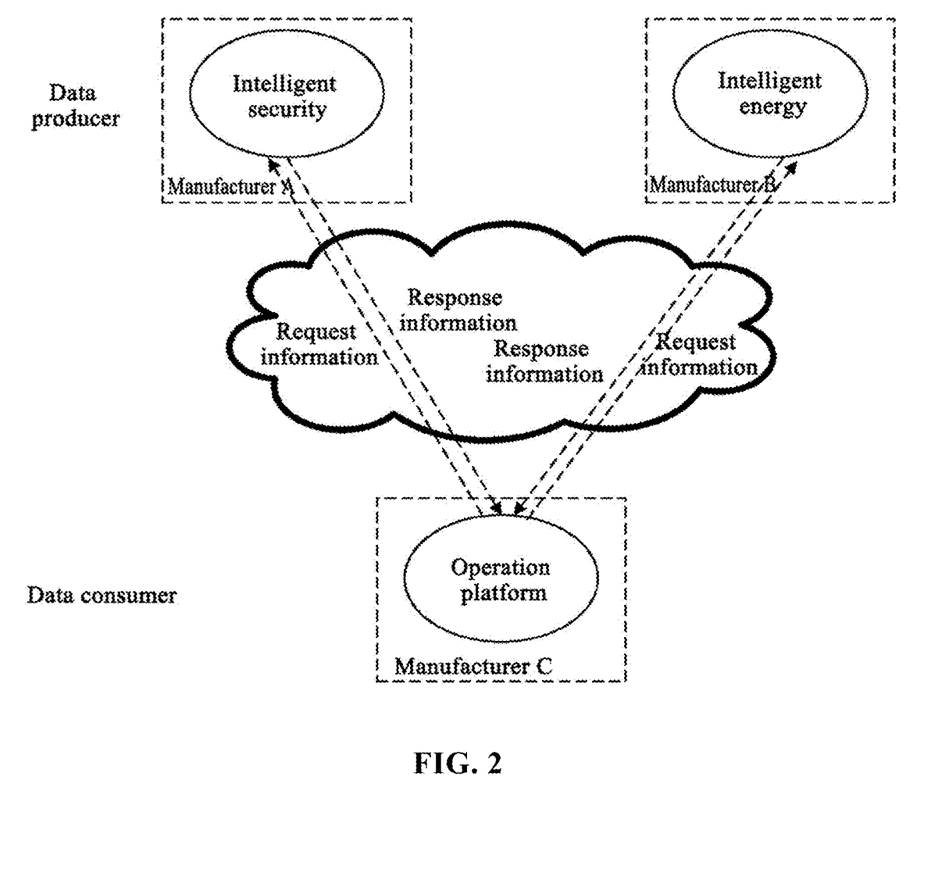
FIG. 2 is a diagram showing a relationship between a data consumer and a data producer according to an embodiment of the present disclosure.

In FIG. 2, manufacturer C serving as a data consumer is required to establish an operation platform, and data of a database corresponding to the operation platform is required to be extracted from a database of intelligent security of manufacturer A and a database of intelligent energy of manufacturer B, where the manufacturers A and B each sever as a data producer.

Figure 3:
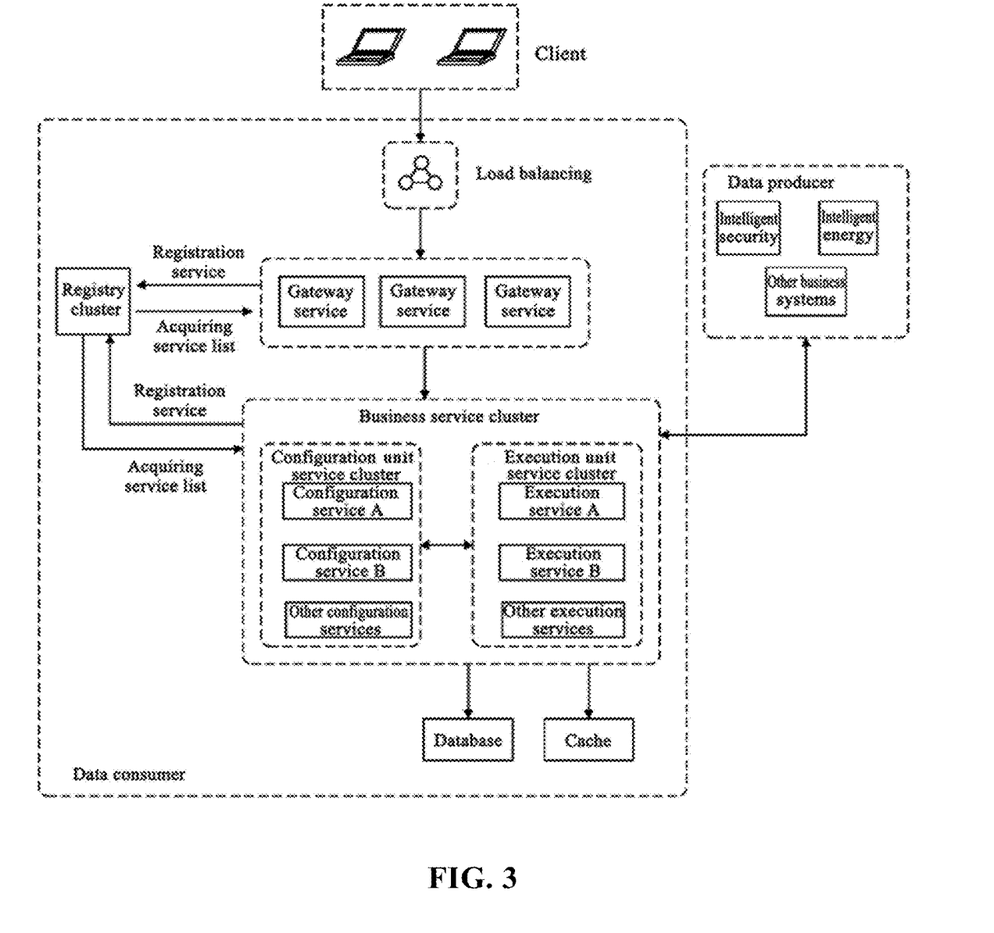
FIG. 3 is a schematic diagram showing a system structure adopted by an operation platform of a data consumer according to an embodiment of the present disclosure.

See FIG. 3, which is a schematic diagram showing a system structure adopted by an operation platform of a data consumer according to an embodiment of the present disclosure. The system is based on microservice architecture, and includes a registry cluster. The registry cluster may be composed of a plurality of service registries 1, the service registries 1 are formed by servers for providing registry services for the services in the system, and the types of the registry services provided by different service registries 1 may be different.

In the microservice architecture, a Spring Eureka (a tool capable of service registration and discovery) is usually used as the registry 1, and services (including configuration service, execution service, and the like) included in the system, registration conditions, availability, states, and the like of the services can be queried through the Spring Eureka, so that the registered services can be managed.

The system further includes a business service cluster, where it can be determined, according to the service list acquired from the registry cluster, that the business service cluster includes a configuration unit service cluster and an execution unit service cluster. The configuration unit service cluster includes a configuration service A, a configuration service B, and other configuration services (corresponding to other business systems of other data consumers). The configuration service A performs relevant configuration for an extraction task (marked as an extraction task A) of extracting required data from manufacturer A (a data producer), and the configuration service B performs relevant configuration for an extraction task (marked as an extraction task B) of extracting required data from manufacturer B (a data producer). The execution service unit cluster includes an execution service A corresponding to the configuration service A, an execution service B corresponding to the configuration service B, and other execution services corresponding to other configuration services. The execution service A is configured to execute the extraction task A generated by the configuration service A and to map the data extracted from the manufacturer A into a database and/or cache (target location) of the manufacturer C (data consumer), and the execution service B is configured to execute the extraction task B generated by the configuration service B and to map the data extracted from the manufacturer B into a database and/or cache (target location) of the manufacturer C (data consumer).

Relevant parameters and the like required in the above configuration service may be input by a user at a client, and may be transmitted to the system through the network, and transmitted to the corresponding configuration service through load balancing and gateway service in the system.

When the operation platform extracts data in the intelligent security, request information is required to be sent to the intelligent security through the network, so that the intelligent security places the extracted data in response information and returns the response information to the operation platform.

In order to implement the above communication, the data consumer defines a Representational State Transfer (REST) based interface, and the data producer also exchanges data with the data consumer through the REST interface.

REST may be used to specify how a client performs data interaction with an Application Programming Interface (API) of a server at a hypertext transfer protocol (HTTP) layer. REST describes data interaction rules of a client and a server in an HTTP layer. The client sends HTTP(s) requests to the server, receives responses of the server, and completes one HTTP interaction. Two important aspects contracted by REST during this interaction are a method adopted by the HTTP request, and a link of the request.

In the present disclosure, a data consumer serves as a client, a data producer serves as a server, a REST based network interface uses a website corresponding to a user list (that is, a website of the data producer) as the link of the request, an operation corresponding to the interface serves as the method adopted by the HTTP request, the data required by the data consumer or information provided to the data producer is provided in request parameters, and the data returned by the data producer based on the request parameters is stored in return values.

Specifically, the REST based interface includes a user list, an interface, a request parameter, and a return value.

The user list is used for storing the website of the data producer.

The interface is used for characterizing operations performed on the data producer.

The request parameter is used for characterizing a parameter requested from the data producer.

The return value is used for characterizing data returned by the data producer based on the request parameters.

The data format adopted by each of the request parameter and the return value is JSON format.

See table 1 for definitions of REST based network interfaces according to the embodiment of the present disclosure.

TABLE 1

| Title | Content |
|---|---|
| | User list (URL) |
| | Interface (Method) |
| | Request parameter (parameter) |
| | Return value |

The REST interface includes an authentication interface based on REST and a data extraction interface based on REST. The authentication interface is configured to obtain authorization information for accessing the data producer, and the data extraction interface is configured to extract data from the data producer, using the authorization information.

It should be noted that the authentication interface and the data extraction interface are both REST interfaces, and have the same components as the REST interfaces. The authentication interface and the data extraction interface differ from each other in that they implement different functions.

In order to legally extract data from the data producer, the data consumer is required to be registered at the data producer first.

In this case, the configuration service 2 is further configured to: send an authorization request to the data producer through the authentication interface, where the authorization request carries a user name and a user password which are required by the data consumer for registration; and receive authorization information returned by the data producer based on the authorization request, where the authorization information is generated based on the username and the user password.

When the REST interface is an authentication interface, the request parameter carries the authorization request, and a return value carries the authorization information.

See table 2, which is a code table for registration based on the REST interface according to the embodiment of the present disclosure.

TABLE 2

| | |
|---|---|
| URL | boe.com.cn/va/x1 |
| Method | POST |
| Request parameters | { "username" : "user", "password": "123456" } |
| Return values | { "status": "ok", "code": "200", "token": "0a32d8de-4789-49a9-afd7-c5544894fdf5" } |

The data producer may add (POST represents adding) a slave data producer (a corresponding website thereof is boe.com.cn/va/x1) according to content shown in Table 2. The authorization request carries the registered user name "user" and the adopted password "123456", and the information serves as request parameters of the REST based interface. The data producer generates corresponding authorization information "0a32d8de-4789-49a9-afd7-c5544894fdf5" the information provided in the request parameter, and the authorization information serves as corresponding information and is stored in a return value of the REST based interface. After the data consumer acquires the authorization information, the data consumer may send a data extraction request for extracting required data to the data producer, using the authorization information. Since the data consumer usually is required to perform data interaction with a plurality of data producers, the data consumer can obtain the authorization information of the data producers by adopting the above manner. For ease of management, the data consumer may store the authorization information obtained from the respective data producers in a local database.

After obtaining the authorization information of the data producer, the data consumer is further required to obtain a field, a field type, and the like of the source data table of the data producer, so as to establish a corresponding extraction task.

To implement this function, the configuration service 2 may be further configured to: acquire a field included in a source data table, where required data are located, from a data producer; and map the field included in the source data table to a field of a target data table of the data consumer, and establish a corresponding extraction task.

The field included in the source data table, where the required data are located, may be acquired from the data producer by the configuration service 2 in the following manner.

Sending a data extraction request to a data producer through a data extraction interface, where the data extraction request carries authorization information and information related to the source data table; receiving a piece of sample data in the source data table returned based on the data extraction request; and acquiring fields and corresponding field types included in the source data table based on the piece of sample data.

In a case where the REST interface is a data extraction interface, the request parameters carry authorization information and a data extraction request, and the return values carry data returned by the data producer based on the data extraction request.

Taking table 2 as an example, after obtaining the authorization information in table 2, the data consumer sends a data extraction request carrying the authorization information to the data producer in table 2 through the data extraction interface. The data producer returns response information (containing a piece of sample data) through the data extraction interface according to the data extraction request. See table 3, which is a code table for extracting data based on a data extraction interface according to an embodiment of the present disclosure.

TABLE 3

| | |
|---|---|
| URL | boe.com. cn/va/x1 |
| Method | POST |
| Request parameters | {<br>"token": "0a32d8de-4789-49a9-afd7-c5544894fdf5",<br>"pageindex": 1,<br>"pagesize": 20<br>} |
| Return values | {<br>"status": "ok",<br>"code": "200",<br>"pageindex": 2,<br>"totalpage": 50,<br>"totalsize": 10000,<br>"data" [<br>  "name": "apple",<br>  "color": "red"<br>]<br>} |

In table 3, based on the data extraction interface, the data consumer carries the authorization information and information related to the source data table (a range of data to be extracted from the source data table of the data producer is 1 page of data every time, and 20 pages of data obtained in total) in the request parameters of the REST interface. The information in the above request parameters is the information in the data extraction request. After receiving the data extraction request, the data producer returns corresponding response information, and the content of the response information is placed in the return values of the REST interface. The return values not only include data returned based on the request parameters (i.e., "name": "applet", "color": "red"), but also include the status of the response message (i.e., "ok", "200", where 200 indicates that the response is successful), and information related to the source data table where the returned data is located (i.e., "pageindex": 2, "totalpage": 50, "totalsize": 10000). Therefore, the data producer tells the data consumer, through the content in the return values, that currently returned in the source data table is the data on page 2, there are 50 pages and 10000 pieces of data in total in the source data table, and the piece of extracted data currently returned is 'name': "applet", "color": "red" (this piece of data is the sample data, if a plurality of pieces of data are returned, and any one of plurality of pieces of data serves as the sample data). It can be determined according to the extracted sample data that two fields, i.e. "name" and "color", are included in the source data table, and it can be determined according to "applet" and "red" that the field type of the two fields, "name" and "color", are character type. Through the data returned from the return values and the information related to the source data table where the data is located, the fields included in the source data table, the field types, the data amount, and the like can be determined, so that the data source of the extraction task can be defined accurately.

After the fields included in the source data table and field types thereof are obtained, the fields included in the source data table may be mapped to the fields in the target data table of the data consumer.

At this time, the configuration service is specifically configured to: define a data source of the extraction task based on the data producer and the source data table, and define a target data model corresponding to a target data table, where the target data model includes a mode of writing data extracted from the data producer into the target data table and a data format adopted by a field type of a field in the target data table; establish a mapping relation between fields in the source data table and fields in the target data table and a data format conversion mode of the mapping fields; and configure an execution period and a data synchronization mode of the extraction task, and establish the extraction task based on the target data model, the mapping relation and the corresponding data format conversion mode.

The definition of the data source, the configuration of the target data model and the establishment of the mapping relation are completed by adopting a graphical interface and based on user operation. The user operation may be a voice instruction, a touch instruction, motion recognition, or the like.

Figure 4:
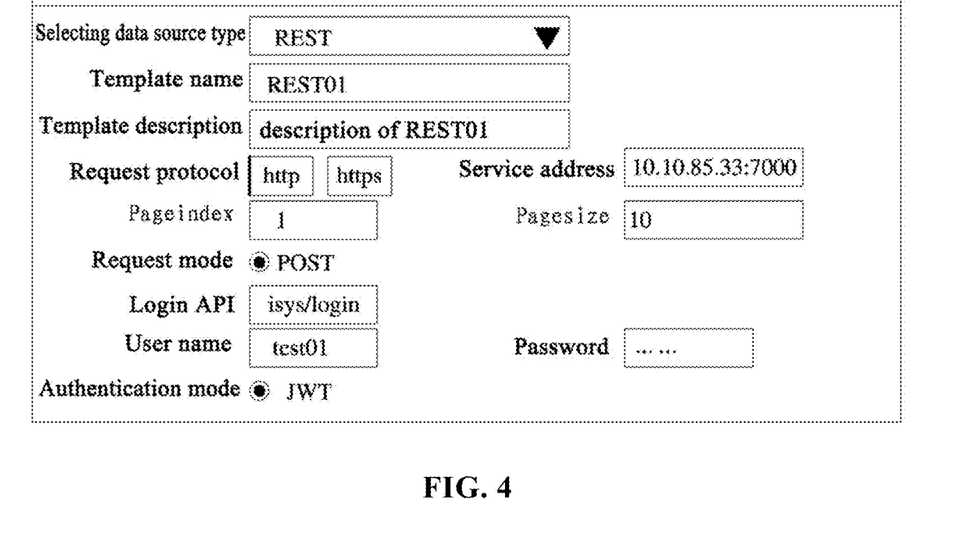
FIG. 4 is a schematic diagram showing a first configuration of a graphical interface of data source definition according to an embodiment of the present disclosure.

See FIG. 4, which is a schematic diagram showing a first configuration of a graphical interface of data source definition according to an embodiment of the present disclosure.

In the graphical interface shown in FIG. 4, the parameters to be configured include Selecting data source type (REST is selected), Template name (REST01), Template description (description of REST01), Request protocol (http and https are supported, http is selected), Service address (10.10.85.33:7000), Pageindex (1), Pagesize (10), Request mode (POST), Login API (isys/login), User name (actural user name), Password, and Authentication mode (JWT is selected), and a user is required to merely input related parameters in the graphical interface.

According to the configuration in FIG. 4, it may be determined that the parameters (request parameters) that are required to be requested in the authentication interface may include user name test01 and password, and parameters (request parameters) that are required to be requested in the data extraction interface include data on pages 1 to 10 in the extraction source data table.

Figure 5:
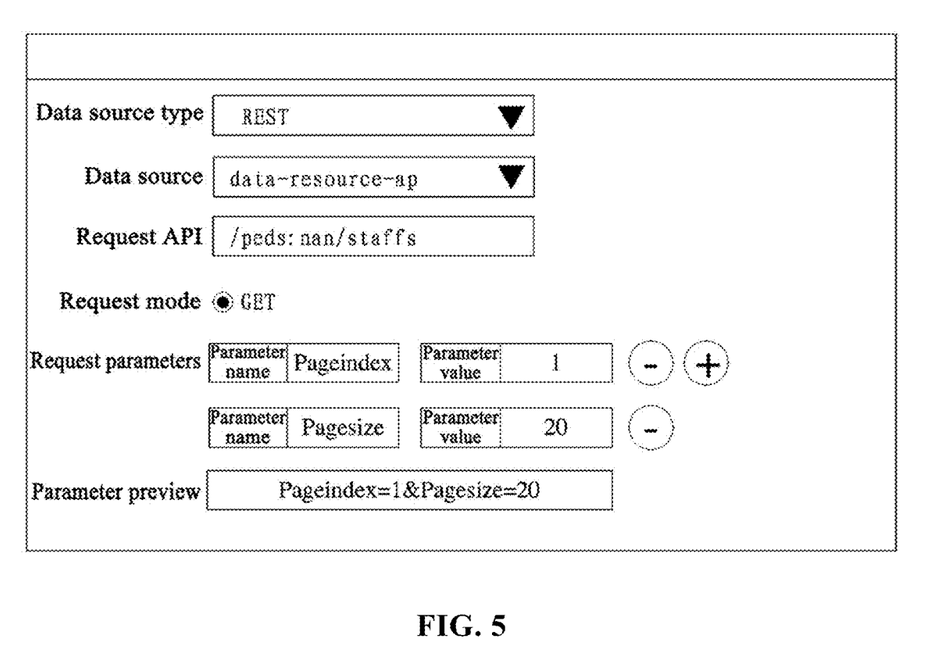
FIG. 5 is a schematic diagram showing a second configuration of a graphical interface of a data source definition according to an embodiment of the present disclosure.

See FIG. 5, which is a schematic diagram showing a second configuration of a graphical interface of data source definition according to an embodiment of the present disclosure.

In the graphical interface shown in FIG. 5, the parameters to be configured include Data source type (set to REST), Data source (set to data-resource-ap), Request API (set to /pets:nan/staffs), Request mode (GET is selected), Request parameters (parameter name and parameter value of any parameter can be set, for example, the parameter value of a parameter named as Pageindex is 1, the parameter value of a parameter named as Pagesize is 20, and in this item, the established parameter can be deleted with the provided minus sign, or a new parameter can be added with a plus sign), and Parameter preview (corresponding preview data Pageindex=1&Pagesize=20 is generated according to the set parameters).

The source definition of the data producer can be input by the user through the graphical interface in FIGS. 4 and 5, and the source definition of the source data table is completed according to the information input by the user.

Figure 6:
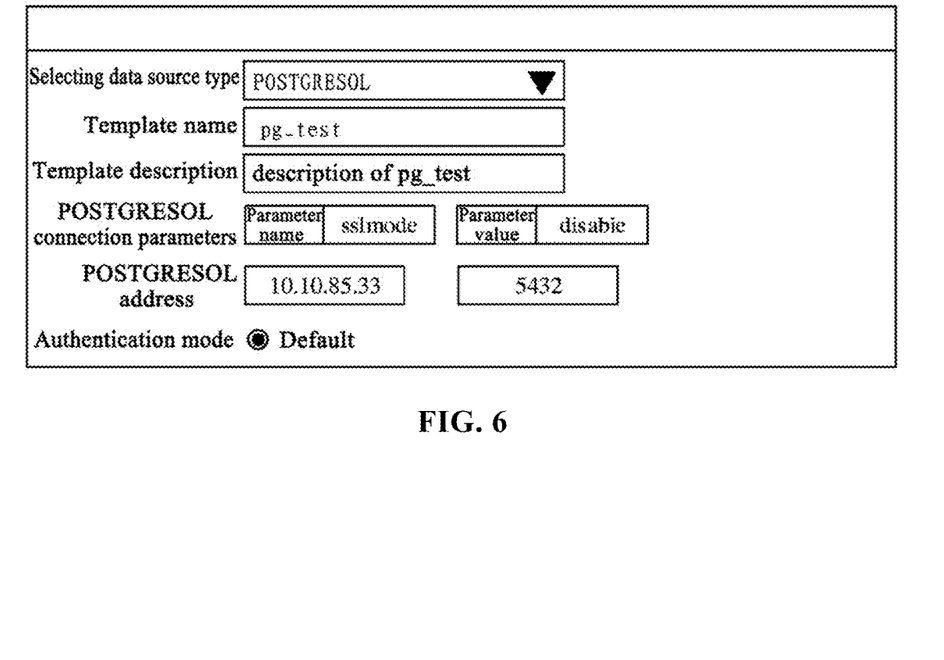
FIG. 6 is a schematic diagram showing a parameter configuration of a graphical interface of a target data model according to an embodiment of the present disclosure.

See FIG. 6, which is a schematic diagram showing a parameter configuration of a graphical interface of a target data model according to an embodiment of the present disclosure.

In the graphical interface shown in FIG. 6, the included parameters are: Selecting data source type (POSTGRESOL is selected), Template name (pg_test), Template description (description of pg_test), POSTGRESOL connection parameters (the parameter name is set to sslmode, the parameter value is set to disabie), POSTGRESOL address (set to 10.10.85.33:5432), and Authentication mode (default is selected). The user can complete the definition of the target data model by setting relevant parameters in the graphical interface.

Figure 7:
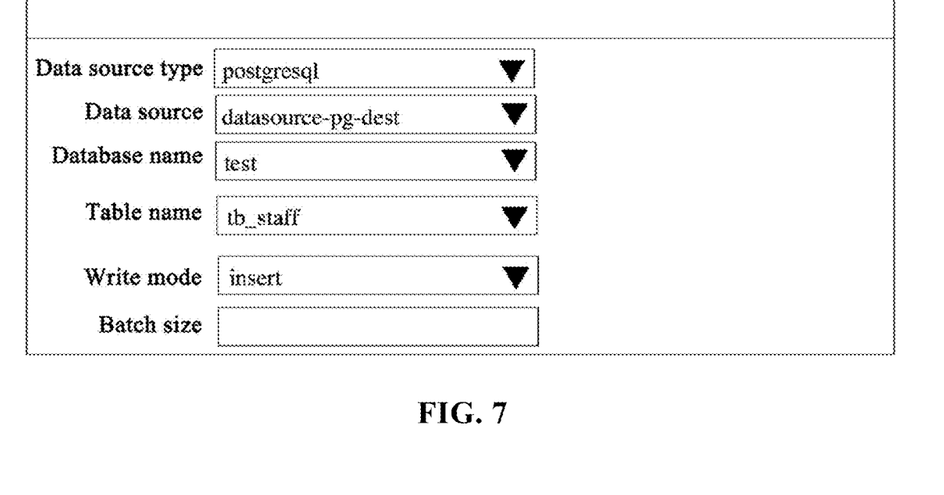
FIG. 7 is a schematic diagram showing a parameter configuration of a graphical interface of a target data table according to an embodiment of the present disclosure.

See FIG. 7, which is a schematic diagram showing a parameter configuration of a graphical interface of a target data table according to an embodiment of the present disclosure.

In the graphical interface shown in FIG. 7, the included parameters are: Data source type (postgresql is selected), Data source (datasource-pg-dest is selected), Database name (i.e., the database name of the target database, which is set to test), Table name (set to tb_staff), Write mode (set to insert), Batch size, and the like. By configuring the parameters in the graphical interface, a user can define to which table in the target database the extracted data is required to be written, whether the extracted data is written in an insert mode or in other modes (such as an overwrite mode), what batch size of the written data is, and the like. When the insert mode is adopted for writing, only newly added data can be written, so that the data transmission quantity can be reduced; when the overwrite mode is adopted for writing data, the changed data can be updated.

Figure 8:
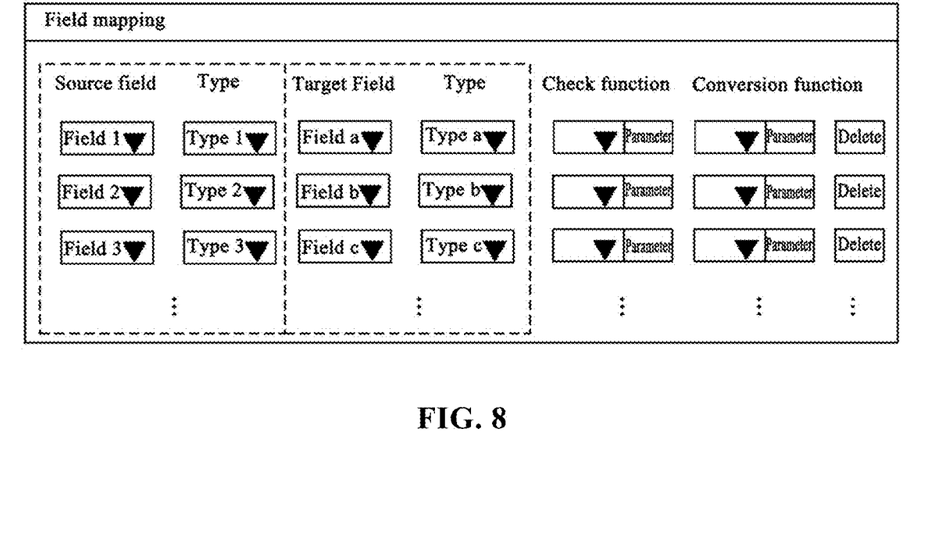
FIG. 8 shows a graphical interface for configuring a mapping relation between a source data table and a target data table according to an embodiment of the present disclosure.

See FIG. 8, which shows a graphical interface for configuring a mapping relation between a source data table and a target data table according to an embodiment of the present disclosure.

In the graphical interface shown in FIG. 8, mainly four parts are included, which are: setting fields included in a source data table (called source fields) and field types thereof (short for types), setting fields included in a target data table corresponding to the source data table (called target fields) and field types thereof (short for types), setting which check function (which parameter is adopted by the check function) is adopted for checking the corresponding source fields and target fields, and setting which conversion function (which parameter is adopted by the conversion function) is adopted for data conversion. As shown in FIG. 8, Source field (including field 1 to field 3), corresponding type thereof (type 1 to type 3), Target field (including field a to field c), and corresponding type thereof (type a to type c) are shown, while the check function, the conversion function, and their parameter settings are not specifically shown in FIG. 8. The user can directly configure the mapping relation between the respective source fields and the respective target fields (the fields in the same row constitute one mapping relation), and the respective field types (i.e. types) of the source fields and the target fields, through the graphical interface. If the field type of one source field is different from that of the corresponding target field having the mapping relation with the source field, a conversion function can be set, and a check function can also be set for checking.

The check function may be a check rule, for example, checking whether the corresponding data meanings before and after conversion with the conversion function are the same or not. The check function is used for checking the conversion result, so that the error of the conversion function in the conversion process can be prevented, the data corresponding to the target field is prevented from being erroneous, and the accuracy of data conversion can be improved. The conversion function is used for converting the field type corresponding to the source field into the field type corresponding to the target field, so that the data extracted from the data producer can be automatically and heterogeneously stored into the data of the data consumer, and the efficiency of heterogeneously storing data is improved.

Figure 9:
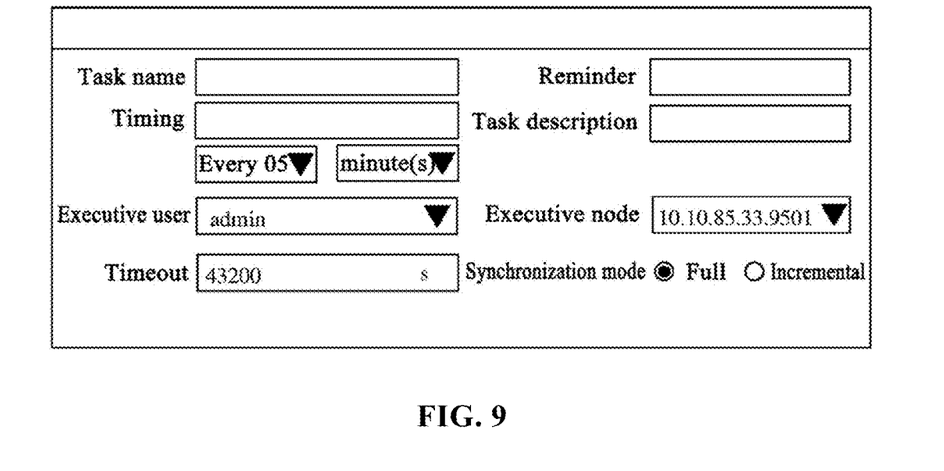
FIG. 9 shows a graphical interface for configuring an extraction task according to an embodiment of the present disclosure.

See FIG. 9, which shows a graphical interface for configuring an extraction task according to an embodiment of the present disclosure.

In the graphical interface shown in FIG. 9, the included parameters are: Task name, Reminder, Timing (e.g., choose to perform a data extraction task every 05 minutes), Task description, Executive user (e.g., set to admin), Executive node (e.g., set to 10.10.85.33.9501), Timeout (e.g., set to 43200 s), Synchronization mode (full or incremental may be selected, full is selected in FIG. 9). The user can configure the execution period and the like of a certain extraction task through the graphical interface shown in FIG. 9.

After the configuration of FIGS. 4 to 9 is completed, the configuration service 2 establishes an extraction task, and provides the extraction task to the execution service 3.

The execution service 3 is configured to: generate a corresponding data extraction request according to the extraction task; send the data extraction request to a data producer through the data extraction interface, and receive correspondingly returned data in a source data table; and convert, through the extraction task, the returned data into data in the target data table and store the data.

Figure 10:
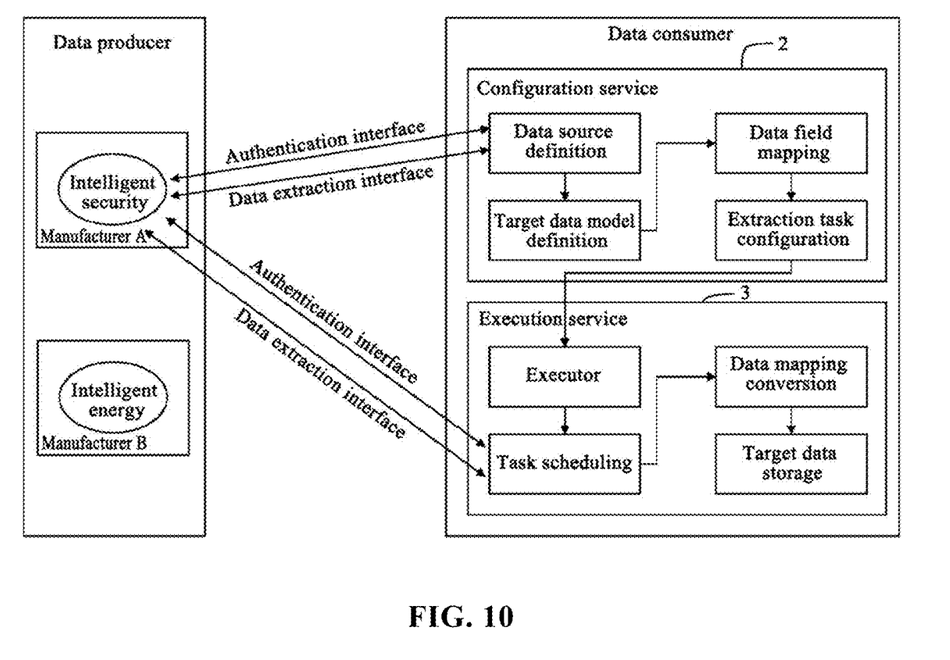
FIG. 10 is a schematic diagram showing a relationship between a configuration service and an execution service according to an embodiment of the present disclosure.

FIG. 10 is a schematic diagram showing a relationship between a configuration service and an execution service according to an embodiment of the present disclosure.

Continuing with FIG. 2 as an example, the configuration service may include by function, several main components, namely, data source definition, target data model definition, data field mapping, and extraction task configuration. The configuration manners of the above components are introduced previously and are not described herein again. Each time the configuration service establishes an extraction task, the corresponding extraction task is sent to the execution service.

tions, the configuration service and the execution service may alternatively be divided into one, two, three, or even more functions. Therefore, it should not be understood that the configuration service and the execution service are limited to be divided into four functions shown in FIG. 10.

Continuing with FIG. 2 as an example, the current operation analysis platform (manufacturer C) needs information such as device data of intelligent security (manufacturer A) and electric quantity data of intelligent energy (manufacturer B), and the code of exchanging data between the manufacturer C as a data consumer and the manufacturers A and B as data producers at the REST based interface is schematically shown in table 4.

TABLE 4

| Name(s) | Manufacturer A | Manufacturer B |
| --- | --- | --- |
| Authentication strategy for transmission through REST based network interface | Url:/security/auth<br>Method: POST<br>Request parameters: { "username": "sec", "username": "Abc7766553" }<br>Response content: { "status": "ok", "code": 200, "token": "xxxxxxxxx"} | Url:/cuxit/login<br>Method: POST<br>Request parameters:<br>{ "username": "ses", "username": "amkD32ddf" }<br>Response content: { "status": "ok", "code": 200, "token": "yyyyyyyyyyyyyyyyy"} |
| Data extraction strategy for transmission through REST based network interface | Url:/security/devices<br>Method: POST<br>Request parameters: { "token": "xxxxxxxxxxx", "pageIndex": 1, "pageSize": 20}<br>Response content: { "status": "ok", "pageIndex": 1, "totalPage": 50, "totalSize": 1000, "data": [<br>{ "devId": "dxxxxxxxx1", "devName": "sensor", "devMac": "AABB88YY"},<br>{"devId": "dxxxxxxxx2", "devName": "camera", "devMac": "XYDDB7"},<br>]} | Url:/cuxit/login<br>Method: POST<br>Request parameters:<br>{ "username": "ses", "username": "amkD32ddf" }<br>{"status": "ok", "pageIndex": 1, "totalPage": 50, "totalSize": 1000, "data": [<br>"shopId": "shop01", "location": "sensor", "ammeter": 345, "month": "202104" },<br>{"shopId": "shop02", "location": "camera", "ammeter": 111, "month": "202104" }<br>]} |

The execution service 3 may include by function several main components, namely, executor, task scheduling, data mapping conversion, and target data storage. The extraction tasks established by the configuration service 2 include corresponding executors in the execution service 3, and the specific control of which executor of the extraction task runs is determined by task scheduling. When the execution service extracts data from a data producer (assuming that the data producer of the currently extracted data is manufacturer A), the task scheduling controls the executor of the extraction task corresponding to the manufacturer A to run, and generate a corresponding data extraction request. After the authorization is performed through the authentication interface, the data extraction request is sent to the intelligent security (source data table) of the manufacturer A through the data extraction interface, so that data are extracted from the intelligent security of the manufacturer A. Data mapping and data format conversion are performed according to the mapping relation between the source data table and the target data table and the field types, where the mapping relation and the field types are configured in the configuration service, the target data table is obtained, and the data are kept (namely target data storage).

It should be noted that, in FIG. 10, the configuration service and the execution service are each divided into four functions shown in FIG. 10. However, in practical applica- According to the information in the REST interface in the above table 4, manufacturer A and manufacturer B may be defined as sources of metadata in the target database of manufacturer C (for example, defined as sourceDs1 and sourceDs2, respectively), and tables in the target database corresponding to manufacturer A and manufacturer B may be defined (for example, defined as destDs1 and destDs2, respectively), where sourceDs1 is mapped to destDs1 and an extraction task 1 is created, and sourceDs2 is mapped to destDs2 and an extraction task 2 is created. By executing the executors corresponding to extraction task 1 and extraction task 2, respectively, data extraction from manufacturer A and manufacturer B can be automatically completed, and the extracted data can be mapped into the target data tables, and the target data tables are stored to target locations.

In the embodiment according to the present disclosure, the system of the data consumer includes at least one configuration service and at least one execution service, each configuration service is configured to perform relevant configuration for an extraction task of extracting data from a corresponding one of the data producers based on the REST interface; a corresponding one of the execution services is configured to execute the extraction task and obtain the extracted data through the REST interface, thereby mapping the extracted data to the target location. The REST interface defined by the data consumer is adopted, so that the data consumer can serve as a client to send an http request to the data producer serving as a server, the data producer returns data required to be extracted by the data consumer according to the REST interface defined by the data consumer, and the data consumer maps the extracted data into the target data table. In this way, the data consumer can obtain the required extracted data without invading the database of the data producer, thereby improving the security of data extraction. Furthermore, there is no need to deploy interface programs between the data consumer and the data producer and develop the interface programs separately, which reduces the investment in manpower and time costs, thereby reducing the development costs of the enterprise. Furthermore, since the data consumer configures the relevant parameters through a graphical interface before data extraction, the operability of the user is improved, and the operation is simple and convenient.

See table 5, which is a table showing a comparison between the advantages and disadvantages of the microservice architecture according to the present disclosure and other systems.

TABLE 5

| Dimension (D) | Product(s) | | |
|---|---|---|---|
| | Kettle | Canal | The present disclosure |
| Product architecture | C/S client component process design, batch processing mode, and online production environment with no management interface. The master-slave structure is not highly available, and has poor expansibility, low framework fault tolerance and poor flexibility. | C/S client mode, development and production environments are required to be deployed independently. The task reproducibility is poor, and it is difficult to flexibly adapt to the change of requirements on data. | Microservice container architecture, non-invasive architecture, complete B/S interface task configuration and monitoring management, simple and easy to use, and high flexibility in adapting to changes. |
| Mode of use | C/S client mode, development and production environment are required to be independently deployed, compiling, debugging and modifying of tasks are local, and the tasks are required to be released to the production environment | C/S client mode, server is responsible for data acquisition and transmission, client is responsible for data receiving and data processing, debugging and deployment are inconvenient | "Click" task design of complete B/S graphical interface, simple and easy to use, agent programs are not required to be deployed at the source database end and the target database end, performance of the source database is hardly influenced. |
| Influence on the database | requirements on structure of the database table are necessary, account numbers and passwords of the database are required, with certain invasiveness | Collection mode based on logs has no invasion to the database, but the performance is consumed when the log file records are opened by the database, all logs of the database are exposed, only suitable for an internal system | Based on REST interface mode, no invasion and very little influence pressure on the source database |
| Data conversion | Manually configuring schema mapping and code logic processing, script writing is required | Manual schema mapping configuration, data receiving and conversion are required to be performed at client, and deployment and debugging are inconvenient | Graphic configuration data mapping, supporting mapping at schema level, table level, and field level, and filtering at record level |

In the embodiment according to the present disclosure, since the universal system for extracting data is developed based on the microservice architecture, and the configuration service, the execution service and the like are registered in the service registry, the configuration service and the execution service aiming at different data production parties can be quickly brought online, the autonomy and the independence of the respective services are improved, the service aiming at a new data producer can be quickly released and brought online, and large scale influence and impact on other functions of the system are not worried about. Furthermore, the respective services can each exist in a component mode, so that the services can be reused and recombined, and a new application of data extraction can be quickly formed and released.

When more users access the system to extract data, certain services in the data extraction application can be expanded in a targeted manner, and the performance bottleneck can be solved. The component corresponding to the certain service in the microservice may be replaced or restored independently.

Furthermore, a system adopting the microservice architecture has incomparable advantages in development efficiency, stability, and expandability, and ensures high availability and high concurrency of services. Furthermore, the application of data extraction running on the system can be quickly brought online, which means that the speed and efficiency are improved. Furthermore, independent capacity expansion and recovery can be realized, which means that the system is safe, stable and highly expandable.

Furthermore, since the microservices themselves are independently published, independently deployed, autonomous, and tiny services, each of the services may be independently arranged in a container. While the container also runs independently cross platforms, and is a small execution unit. Therefore, in the embodiment of the present disclosure, deployment of each service is performed in a containerization manner, and services included in the entire microservice architecture and environments which the services depend on can be deployed to be packaged into a container mirror image. The container is required to package merely the service and the file which the service depends on, so that a light-weight running environment is realized, and the utilization rate of hardware resources is higher than that of the virtual machine. Furthermore, different services in the application depending on the services can be isolated from each other, one-key deployment of the services can be realized, and the workload of operation and maintenance personnel can be greatly reduced.

One of ordinary skill in the art shall appreciate that the embodiments of the present disclosure can be embodied as a method, a system or a computer program product. Therefore the embodiments of the present disclosure can be embodied in the form of an all-hardware embodiment, an all-software embodiment or an embodiment of software and hardware in combination. Furthermore the embodiments of the present disclosure can be embodied in the form of a computer program product embodied in one or more computer useable storage mediums (including but not limited to a disk memory, a CD-ROM, an optical memory, etc.) in which computer useable program codes are contained.

The embodiments of the present disclosure has been described in a flow chart and/or a block diagram of the method, the device (system) and the computer program product according to the embodiments of the present disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently, one of ordinary skill in the art can make various modifications and variations to the present disclosure without departing from the spirit and scope of the present disclosure.

Thus, the present disclosure is also intended to encompass these modifications and variations thereto so long as the modifications and variations come into the scope of the claims appended to the present disclosure and their equivalents.

What is claimed is:

1. A universal system for extracting data, applied to a data consumer, wherein the system is based on microservice architecture, and comprises a service registry, wherein the system comprises:
    at least one configuration service, each of which is configured to perform related configuration for an extraction task of extracting data from a corresponding data producer; and
    at least one execution service, each of which is configured to execute the extraction task and map the extracted data to a target location, wherein the configuration service and the execution service are both registered to the microservice architecture, and each use a REST interface to transfer data when communicating with the data producer,
    wherein the system comprises a processor, and the service registry, the at least one configuration service, and the at least one execution service are configured to be loaded onto the processor to produce a machine,
    wherein the REST interface comprises:
    an authentication interface based on REST and a data extraction interface based on the REST, wherein the authentication interface is configured to obtain authorization information to access the data producer, and the data extraction interface is configured to extract data from the data producer, using the authorization information.

2. The system of claim 1, wherein the configuration service is further configured to:
    send an authorization request to the data producer through the authentication interface, wherein the authorization request carries a user name and a user password which are required by the data consumer for registration; and
    receive authorization information returned by the data producer based on the authorization request, wherein the authorization information is generated based on the username and the user password.

3. The system of claim 2, wherein the configuration service is further configured to:
acquire a field in a source data table, where required data are located, from the data producer; and
map the field in the source data table to a field in a target data table of the data consumer, and establish a corresponding extraction task.

4. The system of claim 3, wherein the configuration service is further configured to:
send a data extraction request to the data producer through the data extraction interface, wherein the data extraction request carries the authorization information and information related to the source data table;
receive a piece of sample data in the source data table returned based on the data extraction request; and
acquire a field in the source data table and a corresponding field type based on the piece of sample data.

5. The system of claim 4, wherein the configuration service is further configured to:
define a data source of the extraction task based on the data producer and the source data table, and define a target data model corresponding to the target data table, wherein the target data model comprises a mode of writing data extracted from the data producer into the target data table and a data format adopted by a field type of a field in the target data table;
establish a mapping relation between the field in the source data table and the field in the target data table and a data format conversion mode of the mapping fields; and
configure an execution period and a data synchronization mode of the extraction task, and establish the extraction task based on the target data model, the mapping relation and the corresponding data format conversion mode.

6. The system of claim 5, wherein the definition of the data source, the configuration of the target data model, and the establishment of the mapping relation are completed by adopting a graphical interface and based on user operation.

7. The system of claim 4, wherein the REST interface comprises:
a user list for storing a website of the data producer;
an interface for characterizing operations performed on the data producer;
a request parameter for characterizing a parameter requested from the data producer; and
a return value for characterizing data returned by the data producer based on the request parameter.

8. The system of claim 7, wherein a data format adopted by each of the request parameter and the return value is JSON format.

9. The system of claim 8, wherein the REST interface is the data extraction interface, the request parameter carries the authorization information and the data extraction request, and the return value carries data returned by the data producer based on the data extraction request.

10. The system of claim 2, wherein the REST interface comprises:
a user list for storing a website of the data producer;
an interface for characterizing operations performed on the data producer;
a request parameter for characterizing a parameter requested from the data producer; and
a return value for characterizing data returned by the data producer based on the request parameter.

11. The system of claim 10, wherein a data format adopted by each of the request parameter and the return value is JSON format.

12. The system of claim 11, wherein the REST interface is the authentication interface, the request parameter carries the authorization request, and the return value carries the authorization information.

13. The system of claim 1, wherein the execution service is configured to:
generate a corresponding data extraction request according to the extraction task;
send the data extraction request to the data producer through the data extraction interface, and receive correspondingly returned data in the source data table; and
convert, through the extraction task, the returned data into data in the target data table and store the data.

14. The system of claim 1, wherein the configuration service and the execution service each use container technology, and each of the at least one configuration service and the at least one execution service runs in a respective container.

* * * * *